US005435706A

United States Patent [19]

Matsumoto et al.

[11] Patent Number: 5,435,706

[45] Date of Patent: Jul. 25, 1995

[54] ORBITING MEMBER FLUID DISPLACEMENT APPARATUS WITH ROTATION PREVENTING MECHANISM

[75] Inventors: Yasuomi Matsumoto, Isesaki; Norio Kitano, Fujioka; Yuji Yoshii, Takasaki, all of Japan

[73] Assignee: Sanden Corporation, Gunma, Japan

[21] Appl. No.: 112,451

[22] Filed: Aug. 27, 1993

[30] Foreign Application Priority Data

Sep. 21, 1992 [JP] Japan ............................ 4-071340 U

[51] Int. Cl.$^{6}$ .......................... F01C 1/04; F01C 21/02; F16D 3/04

[52] U.S. Cl. .................................... 418/55.3; 464/103

[58] Field of Search ................ 418/55.3; 464/102, 103

[56] References Cited

U.S. PATENT DOCUMENTS

| | | | |
|---|---|---|---|
| 4,160,629 | 7/1979 | Hidden et al. | 418/55.3 |
| 4,259,043 | 3/1981 | Hidden et al. | 418/55.3 |
| 4,406,600 | 9/1983 | Terauchi et al. | 418/55.3 |
| 4,457,674 | 7/1984 | Kawano et al. | 418/55.2 |
| 4,457,676 | 7/1984 | Hiraga | 418/57 |
| 4,468,181 | 8/1984 | Sakamoto | 418/55.3 |
| 4,472,120 | 9/1984 | McCullough | 418/83 |
| 4,474,543 | 10/1984 | Hiraga et al. | 418/55.3 |
| 4,492,543 | 1/1985 | Iimori et al. | 418/55.3 |
| 4,545,746 | 10/1985 | Sugimoto et al. | 418/55.3 |
| 4,589,828 | 5/1986 | Sato et al. | 418/55.3 |
| 4,626,179 | 12/1986 | Terauchi | 418/55.2 |
| 4,645,435 | 2/1987 | Sugimoto | 418/55.3 |
| 5,102,315 | 4/1992 | Terauchi et al. | 418/55.3 |

FOREIGN PATENT DOCUMENTS

| | | | |
|---|---|---|---|
| 57-48093 | 9/1982 | Japan | 418/55.3 |
| 63-61790 | 3/1988 | Japan . | |
| 63-192979 | 8/1988 | Japan | 418/55.3 |
| 177779 | 3/1989 | Japan . | |
| 1182587 | 7/1989 | Japan . | |
| 1219377 | 9/1989 | Japan . | |
| 2283882 | 11/1990 | Japan | 418/55.3 |

*Primary Examiner*—John J. Vrablik
*Attorney, Agent, or Firm*—Baker & Botts

[57] ABSTRACT

The present invention discloses a reliable rotation preventing/thrust bearing device for use in an orbiting member fluid displacement apparatus. The rotation preventing/thrust bearing device includes a discrete fixed portion, a discrete orbital portion, and bearing elements. The fixed portion includes a first annular race and a first ring, both of which are formed separately. The first annular race is placed in a loose fit surrounding a first annular step in an inner surface of the housing and the first ring is attached to the housing. The orbital portion includes a second annular race and a second ring, both of which are formed separately. The second annular race is placed in a loose fit surrounding a second annular step in an end plate of the orbiting member and the second ring is attached to the end plate of the orbiting member. A plurality of pockets of the rings face one another in generally aligned pairs. A bearing element is received in each aligned pair of pockets to prevent the rotation of the orbiting member by the bearing elements interacting with the first and second rings and to carry the axial thrust load from the orbiting member. The first and second annular anti-wear plates are overlaid surrounding the first and second annular races, respectively. The first and second annular anti-wear plates are fixedly placed within the first and second annular steps respectively in order to prevent the circumferential and radial movement thereof.

24 Claims, 8 Drawing Sheets

34 35 273 341 375a 377 371 378 372a 113a 112 11 27 271 276 G 376 275 274a 272 274 379 113 374 115 375 37 372 373 12 G 27
272
271
274'
274a'
275
276
273
35
374
375
376
376
375a
377
37'
373
373
372
372a
371

OUTLET
INLET
32
31
12
121
28
26
264
30
261
263
262
272
29
376
377
273
27
34
271
379
374
37
375
372
373
35
181
341
112
371
14
111
18
191
378
10
19
11
16
24
23
13
20
21
15
25
17
22

273
35
341
342
34
36
33
181
18
13

27
272
271
274
274a
275
274b
276
273
274b
35
379a
379
379a
374
375
376
376
375a
377
37
373
373
372
372a
371
378a
378
378a

ORBITING MEMBER FLUID DISPLACEMENT APPARATUS WITH ROTATION PREVENTING MECHANISM

BACKGROUND OF THE INVENTION

1. Field of the Invention

This invention relates to a rotary fluid displacement apparatus, and more particularly, to an improvement in a rotation preventing/thrust bearing device for an orbiting member fluid displacement apparatus.

2. Description of the Prior Art

There are several types of fluid apparatus which utilize an orbiting piston or fluid displacing me, tuber, such as a scroll type fluid displacement apparatus disclosed in U.S. Pat. No. 801,182 to Creux.

The scroll type fluid displacement apparatus disclosed in this U.S. patent includes two scrolls each having a circular end plate and a spiroidal or involute spiral element. These scrolls are maintained angularly and radially offset so that both spiral elements interfit to make a plurality of line contacts between their spiral curved surfaces to thereby seal off and define at least one pair of fluid pockets. The relative orbital motion of the,, two scrolls shifts the line contacts along the spiral curved surfaces and, as a result, the volume of the fluid pockets changes. Because the volume of the fluid pockets increases or decreases dependent on the direction of the orbital motion, the scroll type fluid displacement apparatus is capable of compressing, expanding, or pumping fluids.

Generally, in conventional scroll type fluid displacement apparatus, one scroll is fixed to a housing and the other scroll, which is the orbiting scroll, is eccentrically supported on a crank pin of a rotating shaft to cause the orbital motion. The scroll type fluid displacement apparatus also includes a rotation preventing device which prevents the rotation of the orbiting scroll to thereby maintain both scrolls in a predetermined angular relationship during operation of the apparatus.

Sealing along the line contacts of the above conventional scroll type apparatus must be maintained because the fluid pockets are defined by the line contacts between the two spiral elements and as the line contacts shift along the surface of the spiral elements, the fluid pockets change volume due to the orbital motion of the orbiting scroll. Because the orbiting scroll in such conventional scroll type apparatus is supported in a cantilever manner, an axial slant of the orbiting scroll occurs. Axial slant also occurs because the movement of the orbiting scroll is not rotary motion around the center of the orbiting scroll, but is orbiting motion caused by eccentric movement of a crank pin driven by the rotation of a drive shaft. Several problems result from the axial slant; such as, loss of sealing of the line contact, vibration of the apparatus during operation, and noise caused by physical striking of the spiral elements.

One simple and direct solution to this problem is the use of a thrust bearing device for carrying the axial thrust load. Thus, scroll type fluid displacement apparatus have been provided with rotation preventing and thrust bearing devices within their housings.

One recent attempt to improve rotation preventing and thrust bearing devices for scroll type fluid displacement apparatus is described in U.S. Pat. Nos. 4,160,629 to Hidden et al. and 4,259,043 to Hidden et al. The rotation preventing and thrust bearing devices in these U.S. patents are integral with one another. The rotation preventing/thrust bearing device described in these U.S. patents (see, e.g., FIG. 7 of U.S. Pat. No. 4,259,043 to Hidden et al.), comprises one set of indentations formed on the end surface of the circular plate of the orbiting scroll and a second set of indentations formed on an end surface of a fixed plate attached to the housing. A plurality of spheres are placed between facing indentations. Nevertheless, the indentations are formed directly on the end surface of orbiting scroll or the fixed plate. The production of this type of mechanism is, therefore, very intricate.

Referring to FIGS. 1, 2, and 3, one solution to the above disadvantage will be described. FIG. 1 is an enlarged vertical section view of a part of a compressor and FIG. 2 is an exploded perspective view of a rotation preventing/thrust bearing device 37'. Rotation preventing/thrust bearing device 37' surrounds boss 273 of orbiting scroll 27. Annular steps 274', 275, and 276, which are concentrically surrounding boss 273, are formed at the end surface of circular end plate 271 opposite to spiral element 272. Annular step 274' is radially largest and closest to spiral element 272. Annular step 276 is radially smallest and furthest from spiral element 272. Annular step 275 is located between annular steps 274' and 276. Similarly, annular steps 113' and 115 are formed at the end surface of annular projection 112 of front end plate 11, which rotatably supports a drive shaft (not shown) and is fixedly attached to an opening end of casing 12. Annular steps 113' and 115 are concentric with annular projection 112, and annular step 113' is radially smallest and furthest from spiral element 272.

Rotation preventing/thrust bearing device 37' includes an orbital portion, a fixed portion and bearings, such as a plurality of balls or spheres. The fixed portion includes (1) first annular race 371 which is disposed surrounding annular step 113' by a later-mentioned manner and (2) first ring 372 fitted against the axial end surface of annular projection 112 of front end plate 11 to cover the end surface of first annular race 371. First annular race 371 is loosely fitted within annular step 113' because the outer diameter of first annular race 371 is designed to be slightly smaller than a diameter of an annular side wall 113'a of annular step 113'. First ring 372 is fixedly attached to the axial end surface of annular projection 112 by pins 373. First annular race 371 has an axial end surface flush with the axial end surface of annular step 115. The height differential between the axial end surface of annular step 115 and the axial end surface of annular projection 112 of front end plate 11 defines a clearance "G" between first annular race 371 and first ring 372.

The orbital portion includes (1) second annular race 374 which is disposed within annular step 274' by a later-mentioned manner and (2) second ring 375 fitted against the axial end surface of annular step 276 to cover the axial end surface of second annular race 374. Second annular race 374 is loosely fitted within annular step 274' because an inner diameter of second annular race 374 is designed to be slightly greater than a diameter of an annular side wall 274' a of annular step 274'. Second ring 375 is fixedly attached to the axial end surface of annular step 276 by pins 376. Second annular race 2;74 has an axial end surface flush with the axial end surface of annular step 275. The height differential between the axial end surface of annular step 275 and the axial end surface of annular step 276 defines a clearance "G"

between the second annular race 374 and the second ring 375 identical to the clearance between the first annular race 371 and the first ring 372.

First ring 372 and second ring 375 each have a plurality of holes or pockets 372*a* and 375*a* in the axial direction, the number of holes or pockets in each ring 372, 375 being equal. The holes or pockets 372*a* of first ring 372 correspond to or are a mirror image of the holes or pockets 375*a* of the second ring 375, i.e., each pair of pockets facing each other have the same size and pitch, and the radial distance of the pockets from the center of their respective rings 372 and 375 is the same, i.e., the centers of the pockets are located the same distance from the center of the rings 372 and 375. Bearing elements, such as balls or spheres 377, are placed between facing, generally aligned pairs of pockets 372*a* and 375*a*.

Referring to FIG. 3, the operation of the rotation preventing/thrust bearing device 37′ will be described. In FIG. 3, the center of second ring 375 is placed at the right side and the rotating direction of the drive shaft is clockwise, as indicated by arrow "A." When orbiting scroll 27 is driven by the rotation of the drive shaft, the center of second ring 375 orbits about a circle of radius "$R_o$" (together with orbiting scroll 27). Nevertheless, a rotating force, i.e., moment, which is caused by the offset of the acting point of the reaction force of compression and the acting point of drive force, acts on orbiting scroll 27. This reaction force tends to rotate orbiting scroll 27 in a clockwise direction about the center of second ring 375. As shown in FIG. 3, however, eighteen balls 377 are placed between the corresponding pockets 372*a* and 375*a* of rings 372 and 375. In Figure .3, the interaction between the nine balls 377 at the top of the rotation preventing/thrust bearing device and the edges of the pockets 372*a* and 375*a* prevents the rotation of orbiting scroll 27. The magnitude of the rotation preventing forces are shown as $fc_1$–$fc_5$ in FIG. 3. According to the orbital motion of orbiting scroll 27, the interaction between the nine balls 377 and the edges of the pockets 372*a* and 375*a* successively shifts in the rotating direction of the drive shaft.

Not only does the reaction force of compression tend to rotate orbiting scroll in the clockwise direction, but it tends to move orbiting scroll 27 forwardly (to the left in FIG. 1) to thereby cause the axial thrust load on an inner end of the drive shaft through bushing 34. This axial thrust load is carried by the front end plate 11 through second annular race 374, all eighteen balls 377 and first annular race 371. Therefore, each of eighteen balls 377 comes in contact with the end surface of both first and second annular races 371 and 374, and rolls thereon within the corresponding pockets 372*a* and 375*a* during the orbital motion of orbiting scroll 27. As balls 377 roll on the axial end surface of first annular race 371, the first annular race 371 freely rotates on the axial end surface of the annular step 113′ because of a frictional contact between balls 377 and race 371. As a result, the circular trace of the balls 377 on the axial end surface of first annular race 371 is sufficiently dissolved so that the exfoliation of the axial end surface of first annular race 371 is effectively prevented. Similarly, the second annular race 374 freely rotates on the axial end surface of annular step 274′ in the same rotational direction, so that a similar advantage to that described above is also obtained.

In the construction, as described above, the rotation preventing/thrust bearing device 37′ is made up of a pair of races and a pair of rings, with each race and ring formed separately. Therefore, the parts of the rotation/-thrust bearing device are easy to construct and the most suitable material for each part can be selected. In general, in order to be able to sufficiently bear the axial thrust load and the interacting stress, balls 377, first and second rings 372 and 375, and first and second annular races 371 and 374 are made of stiff and hard material, for example, steel; while in order to reduce the weight of the compressor, front end plate 11, casing 12, and the two scroll members are made of light weight material, for example, aluminum alloy, which is relatively softer than steel.

Accordingly, as first annular race 371 freely rotates on the axial end surface of the annular step 113′ of front end plate 11 during operation of the compressor, the axial end surface of first annular race 371 and the axial end surface of annular step 113′ become in a frictional contact between hard and soft metals. This frictional contact causes an abnormal abrasion at the axial end surface of annular step 113′. Therefore, the clearance "G" between first annular race 371 and first ring 372 becomes sufficiently greater than that allowable in a short time period during operation of the compressor, and a similar defective operational manner also occurs between the second annular race 374 and second ring 375. As a result, the compressor begins to defectively operate in a short time period.

SUMMARY OF THE INVENTION

Accordingly, it is an object of this invention to provide a reliable rotation preventing/thrust bearing device for an orbiting member fluid displacement apparatus.

It is a further object of this invention to provide a reliable rotation preventing/thrust bearing device that is relatively lightweight.

It is yet a further object of this invention to provide a reliable rotation preventing/thrust bearing device that is relatively simple in design and manufacture.

An orbiting member fluid displacement apparatus according to this invention includes a housing. A fixed member is attached to the housing and has a first end plate from which a first spiral element extends into the interior of the housing. An orbiting member has a second end plate from which a second spiral element extends. The first and second spiral elements interfit at an angular and radial offset to make a line contact to separate a fluid inlet from a fluid outlet. A driving mechanism includes a drive shaft, which is rotatably supported by the housing and is operatively connected to the orbiting member to effect the orbital motion of the orbiting member.

A rotation preventing/thrust bearing device is disposed between the housing and the orbiting member for preventing the rotation of the orbiting member during orbital motion, so that the fluid pocket changes volume during the orbital motion of the orbiting member.

The rotation preventing/thrust bearing device comprises an orbital portion, a fixed portion and a plurality of bearings such as balls or spheres. The fixed portion includes a first annular race and a first ring, both of which are formed separately. The first annular race is placed in a loose fit within a first annular step formed on an inner surface of the housing. The first ring is attached to the inner surface of the housing to cover the first annular race and has a plurality of first pockets formed in an axial direction toward the first annular race. The orbital portion includes a second annular race and a second ring, both of which are formed separately. The second annular race is placed in a loose fit within a second annular step formed on an end surface of the second end plate opposite to the side from which the second spiral element extends. The second ring is attached to the end surface of the second end plate to cover the second race and has a plurality of second pockets formed in an axial direction toward the second race. A clearance is maintained between the second ring of the orbital portion and the first ring of the fixed portion. The bearings are placed between facing and generally aligned first and second pockets of the rings. The rotation of the orbiting member is thus; prevented by the bearings which are placed in the pockets of both rings. Further, thrust load from the orbiting member is supported by the first race of the fixed portion through the bearings.

The fixed portion further includes a first annular plate which is fixedly placed surrounding the first annular step and is overlaid on the first annular race. The first annular plate has a hardness which is substantially equal to hardness of the first annular race. The orbital portion includes a second annular plate which is fixedly placed surrounding the second annular step and is overlaid on the second annular race. The second annular plate has a hardness which is substantially equal to hardness of the second annular race.

Other objects, features, and advantages of this invention will be understood from the following detailed description of the preferred embodiment of this invention and the drawings.

DETAILED DESCRIPTION OF THE PREFERRED EMBODIMENT

Figure 1:
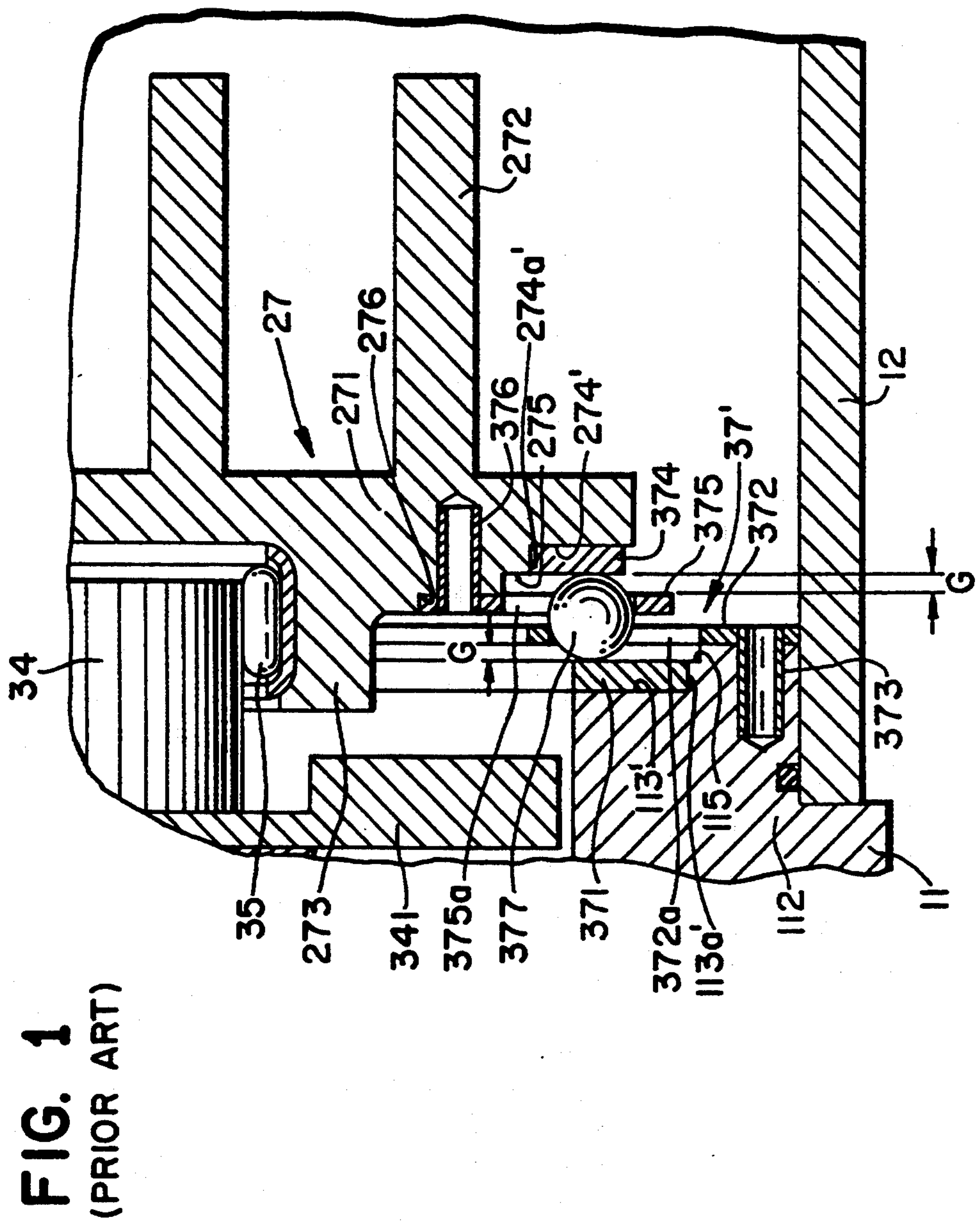
FIG. 1 is an enlarged longitudinal vertical sectional view of a portion of a scroll compressor unit illustrating a prior art construction of the rotation preventing/thrust bearing device.
Figure 2:
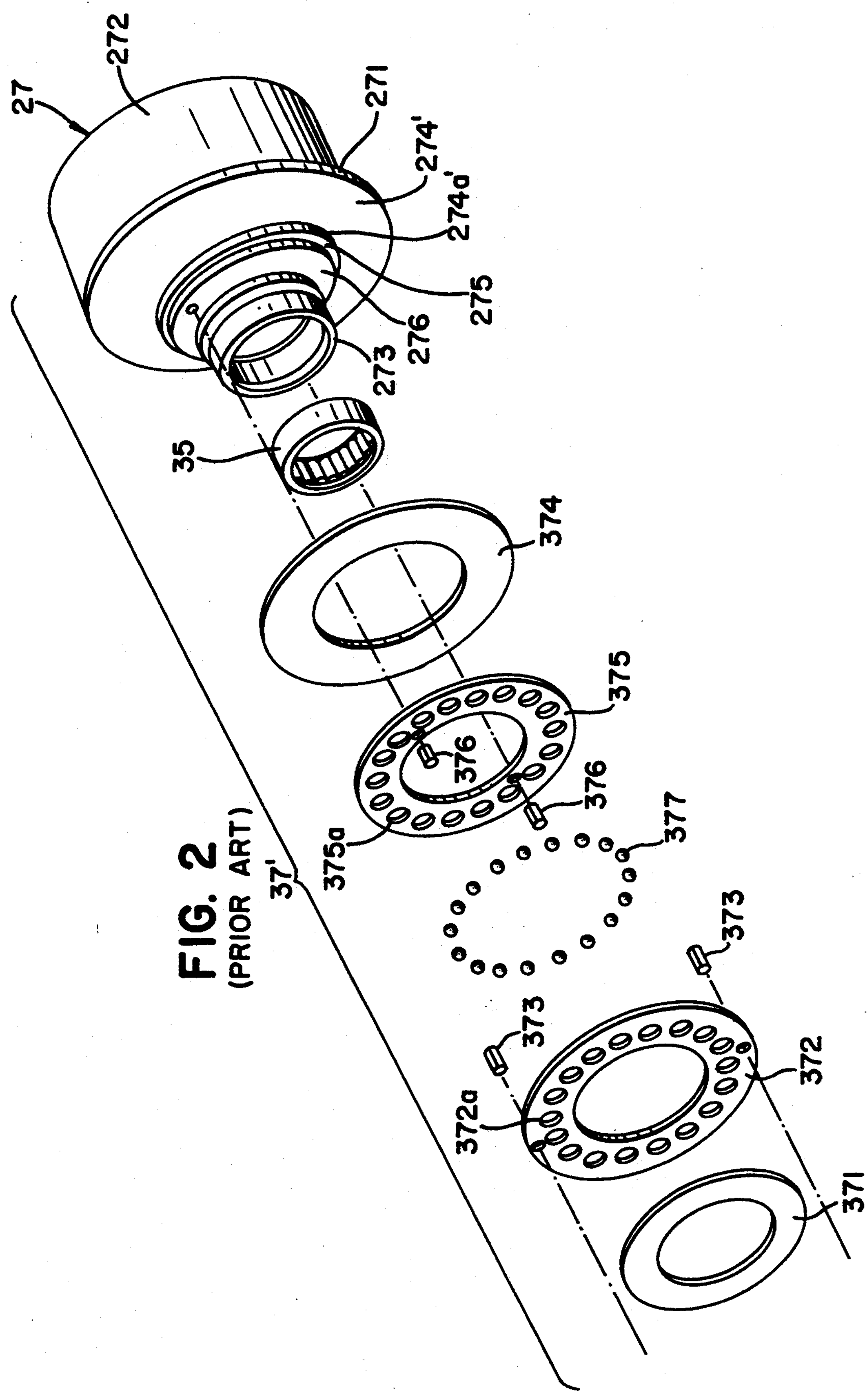
FIG. 2 is an exploded perspective view of the rotation preventing/thrust bearing device shown in FIG. 1.
Figure 3:
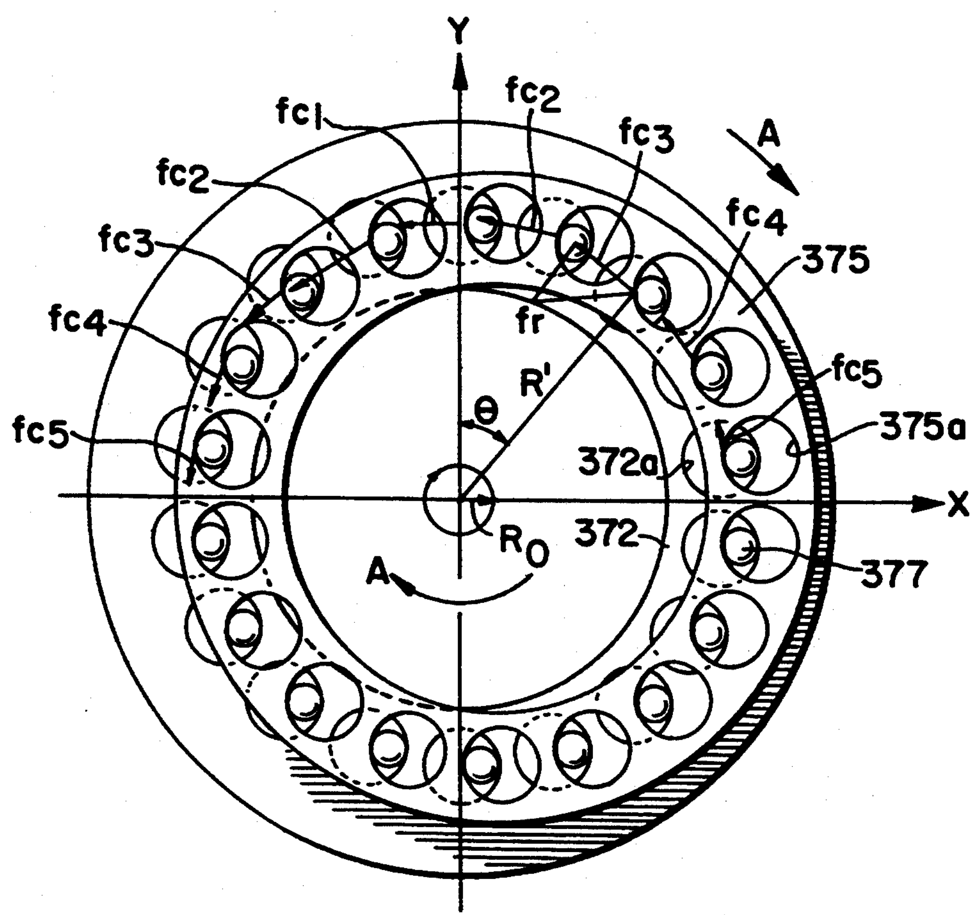
FIG. 3 is a diagrammatic plan view of the rotation preventing/thrust bearing device of FIG. 1 illustrating the manner by which rotation is prevented.

In FIGS. 4–8, identical reference numerals are used to denote elements which are identical to the similarly numbered elements shown in prior art FIGS. 1, 2 and 3. Further, in the following description, the left side of FIGS. 4 and 7 will be referred to as the front or forward side and the right side will be referred to as the rear side.

Referring to FIGS. 4–8, a fluid displacement apparatus in accordance with one embodiment of the present invention, in particular a scroll type refrigerant compressor unit 1, is shown. The compressor unit 1 includes a compressor housing 10 having a front end plate 11 and a cup-shaped casing 12 which is attached to an end surface of front end plate 11. An opening 111 is formed in the center of front end plate 11 for penetration or passage of a drive shaft 13. An annular projection 112 is formed in a rear end surface of front end plate 11. Annular projection 112 faces cup-shaped casing 12 and is concentric with opening 111. An outer peripheral surface of annular projection 112 extends into an inner wall of the opening of cup-shaped casing 12. Cup-shaped casing 112 is fixed on the rear end surface of front end plate 11 by a fastening device, for example, screws. The opening portion of cup-shaped casing 12 is thus covered by front end plate 11. An O-ring 14 is placed between the outer peripheral surface of annular projection 112 and the inner wall of the opening of cup-shaped casing 12, to seal the, mating surfaces of front end plate 11 and cup-shaped casing 12. Front end plate 11 has an annular sleeve 15 projecting from the front end surface thereof which surrounds drive shaft 13 and defines a shaft cavity. In the embodiment shown in FIG. 4, sleeve. 15 is separate from end plate 11. Therefore, sleeve 15 is fixed to the front end surface of front end plate 11 by screws (not shown). An O-ring 16 is placed between the end surface of front end plate 11 and an end surface of sleeve 15 to seal fitting surface of front end plate 11 and sleeve 15. Alternatively, sleeve 15 may be integral with end plate 11.

Drive shaft 13 is rotatably supported by sleeve 15 through a bearing device 17 located within the front end of sleeve 15. Drive shaft 13 has a disk 18 at its inner end which is rotatably supported by front end plate 11 through a bearing device 19 located within opening 111 of front end plate 11. A shaft seal assembly 20 is coupled to drive shaft 13 within the shaft seal cavity of sleeve 15.

A pulley 21 is rotatably supported by a bearing assembly 22 which is carried out on the outer surface of sleeve 15. An electromagnetic coil 23 is fixed about the outer surface of sleeve 15 by a support plate 24 and is received in annular cavity of pulley 21. Armature plate 25 is elastically supported on the outer end of drive shaft 13 which extends from sleeve 15. An electromagnetic clutch thus includes pulley 21, electromagnetic coil 23 and armature plate 25. In operation, drive shaft 13 is driven by an external &ire power source, for example, a vehicle engine, through a rotation force transmitting device such as the above-described electromagnetic clutch.

A fixed scroll (fixed member) 26, an orbiting scroll (orbiting member) 27, a driving mechanism for orbiting scroll 27, and a rotation preventing/thrust bearing device for orbiting scroll 27 are located within an inner chamber of cup-shaped casing 12. The inner chamber is formed between the inner wall of cup-shaped casing 12 and front end plate 11.

Fixed scroll 26 includes a circular end plate 261, a wrap or spiral element (fixed fluid displacement member) 262 affixed to or extending from one side surface of circular end plate 261, and a plurality of internally threaded bosses 263 axially projecting from the other end surface of circular plate 261. An end surface of each boss 263 is seated on the inner surface of an end plate 121 of cup-shaped casing 12 and is fixed to end plate 121 by screws 28. Fixed scroll 26 is thus fixed within cup-shaped casing 12. Circular end plate 261 of fixed scroll 26 divides the inner chamber of cup-shaped casing 12 into a discharge chamber 30 and a suction chamber 29 with a seal ring 31 placed between the outer peripheral surface of circular plate 261 and the inner wall of cup-shaped casing 12. A hole or discharge port 264 is formed through circular plate 261 at a position near the center of spiral element 262; discharge port 264 is connected between the centrally located fluid pocket of the spiral element 262 and discharge chamber 30.

Orbiting scroll 27 also includes a circular end plate 271 and a wrap or spiral element (orbiting fluid displacement member) 272 affixed to or extending from one side surface or circular end plate 271. Spiral element 272 and spiral element 262 of fixed scroll 26 interfit at angular offset of 180° and a predetermined radial offset. At least a pair of fluid pockets are thereby defined between spiral elements 262 and 272. Orbiting scroll 27 which is connected to the driving mechanism and to the rotation preventing/thrust bearing device is driven in an orbital motion at a circular radius "$R_o$" by rotation of drive shaft 13 to thereby compress fluid passing through the compressor unit. Generally, radius $R_o$ of orbital motion is given by the following formula:

$$R_o=(\text{pitch of spiral element})/2-(\text{wall thickness of spiral element})$$

Figure 5:
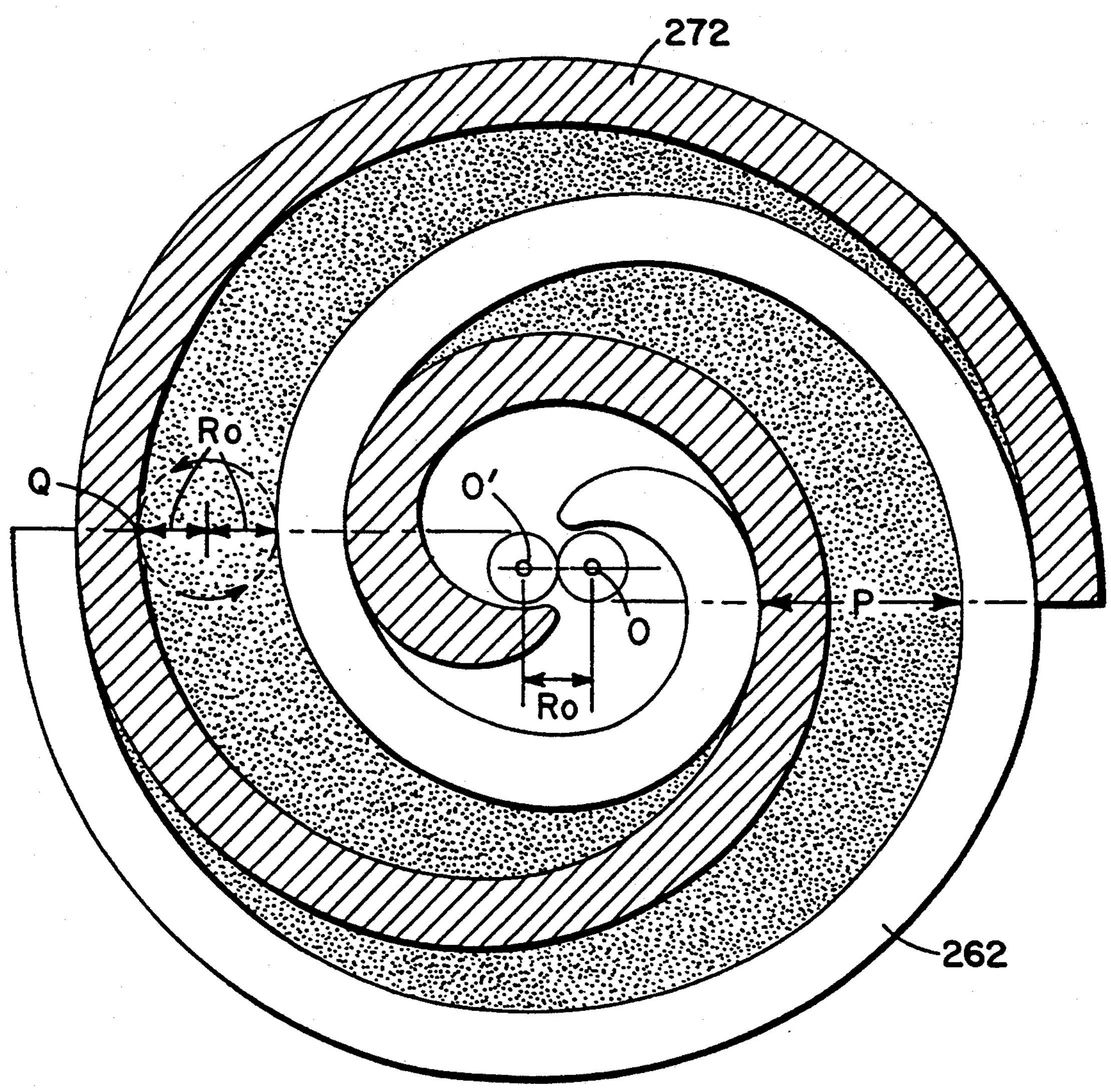
FIG. 5 is a diagrammatic sectional view illustrating the spiral elements of the fixed and orbiting scroll members.
Figure 6:
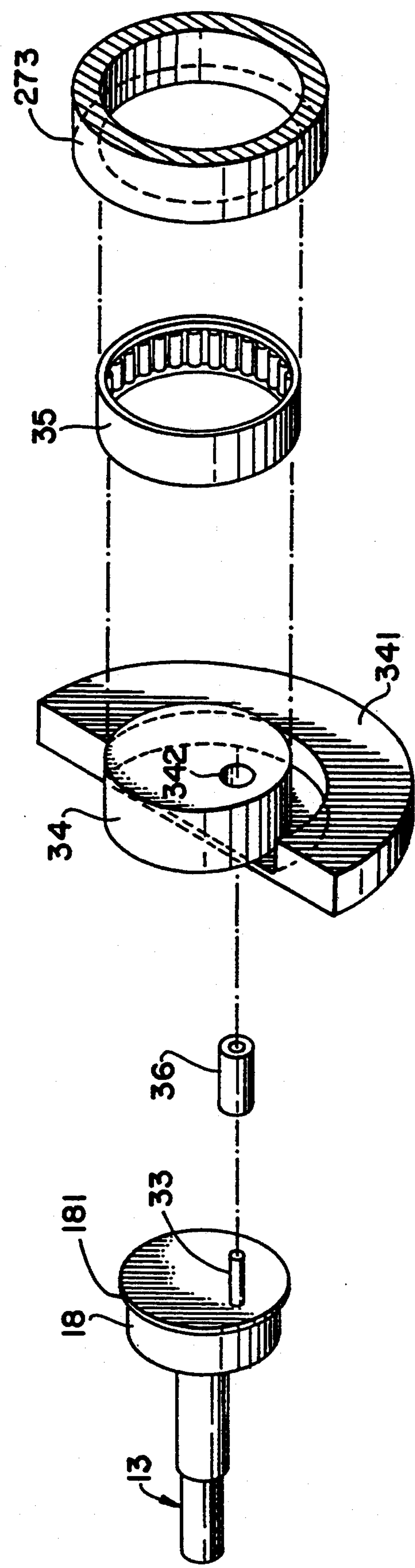
FIG. 6 is an exploded perspective view of the driving mechanism in the embodiment of FIG. 4.

As shown in FIG. 5, the pitch (P) of the spiral elements can be defined by "$2\pi rg$", where "rg" is the involute generating circle radius. The radius of orbital motion "$R_o$" is also illustrated in FIG. 5 as the locus of an arbitrary point "Q" on wrap 272 of orbiting scroll. 27. A point "0′" is the center of spiral element 272 of orbiting scroll 27, and a point "0" is the center of spiral element 262 of fixed scroll 26. The center "0′" of spiral element 272 is radially offset from the center "0" of spiral element 262 of fixed scroll 26 by the, distance "$R_o$". Thus, orbiting scroll 27 undergoes orbital motion of a radius "$R_o$" upon rotation of drive shaft 13. As the orbiting scroll 27 orbits, the line contacts between spiral elements 262 and 272 move toward the center of the spiral elements along the surfaces of the spiral elements. Fluid pockets, which are defined between spiral elements 262 and 272, also move to the center with a consequent reduction in volume and compression of the fluid in the fluid pockets. The fluid of refrigerant gas, which is introduced into suction chamber 29 from an external fluid circuit through an inlet port 31, is taken into fluid pockets formed between spiral elements 262 and 272 from the outer end portions of the spiral elements. As orbiting scroll 27 orbits, fluid in the fluid pockets is compressed and the compressed fluid is discharged into discharge chamber 30 from the central fluid pocket of the spiral elements through discharge port 264. The discharged fluid then flows to the external fluid circuit through an outlet port 32.

Referring again to FIGS. 4 and 6, the driving mechanism of orbiting scroll 27 will be described in greater detail. Drive shaft 13, which is rotatably supported by sleeve 15 through bearing device 17, includes disk 18 which is integrally formed at the inner end of drive shaft 13. Disk 18 is rotatably supported by front end plate 11 through bearing device 19 located within opening 111 of front end plate 11. Disk 18 includes an annular flange 181 radially extending from a periphery of a rear end surface thereof. Annular flange 181 of disk 18 is in contact with an annular inner race 191 of bearing device 19, so that the forward motion of drive shaft 13 is prevented. A crank or drive pin 33 projects axially from an axial end surface of disk 18 at a position which is radially offset from the center of drive shaft 13. Circular end plate 271 of orbiting scroll 27 has a tubular boss 273 axially projecting from the end surface opposite the surface from which spiral element 272 extends. A discoid or short axial bushing 34 fits into boss 273 and is rotatably supported therein by a bearing such as a needle bearing 35. Bushing 34 has a balance weight 341, which has the shape of a portion of a disk or ring and extends radially from bushing 34 along a front surface thereof. An eccentric hole 342 is formed in bushing 34 at a position radially offset from center of bushing 34. Drive pin 33 fits into the eccentrically disposed hole 342 together with a bearing 36. Bushing 34 is therefore driven in an orbital path by the revolution of drive pin 33 and rotates within needle bearing 35.

Now, the rotation of orbiting scroll 27 is prevented by a rotation preventing/thrust bearing device 37 which is located between the inner surface of front end plate 11 and circular end plate 271 of orbiting scroll 27. As a result, orbiting scroll 27 orbits while maintaining its angular orientation relative to the fixed scroll 26.

Figure 4:
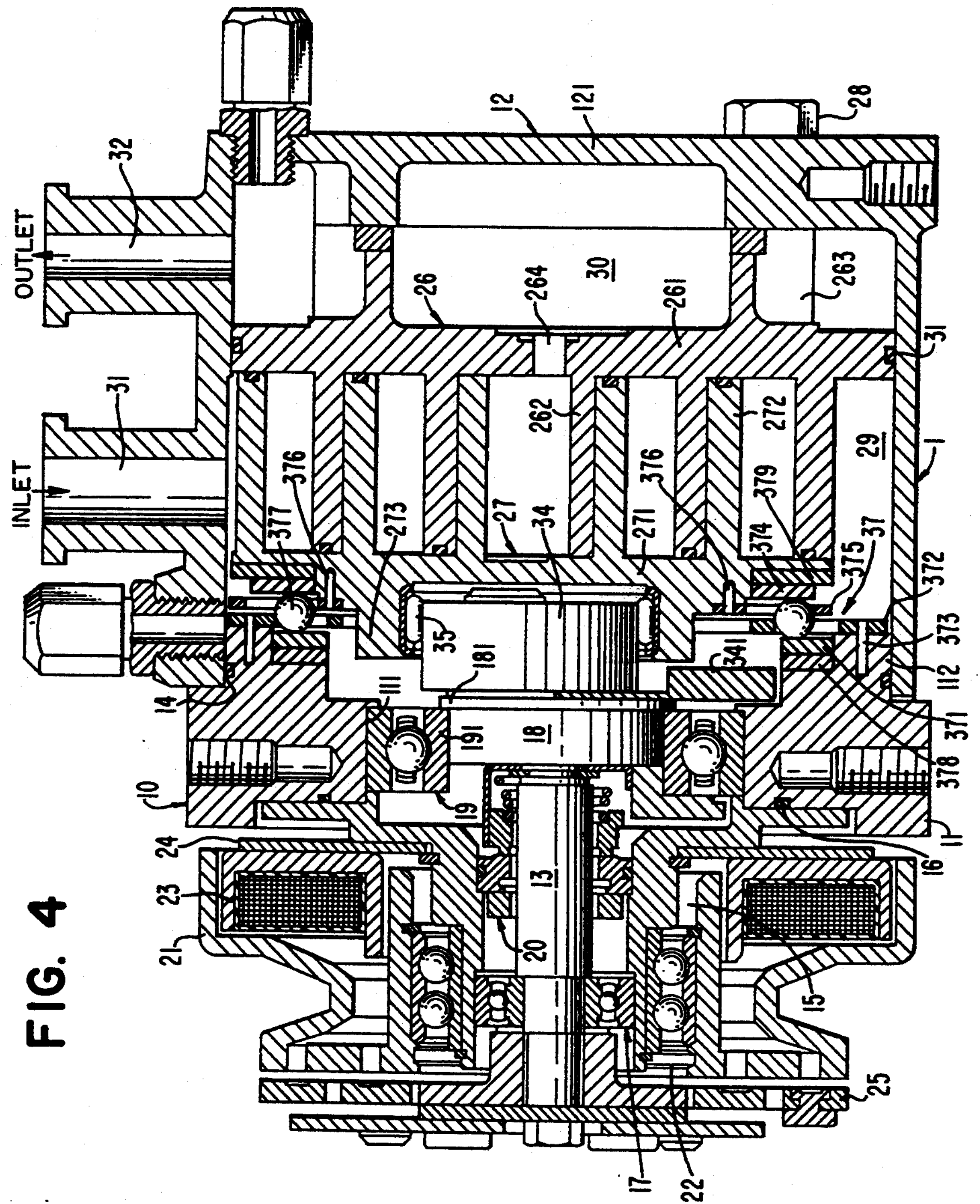
FIG. 4 is a longitudinal vertical sectional view of a compressor unit according to one embodiment of the present invention.
Figure 7:
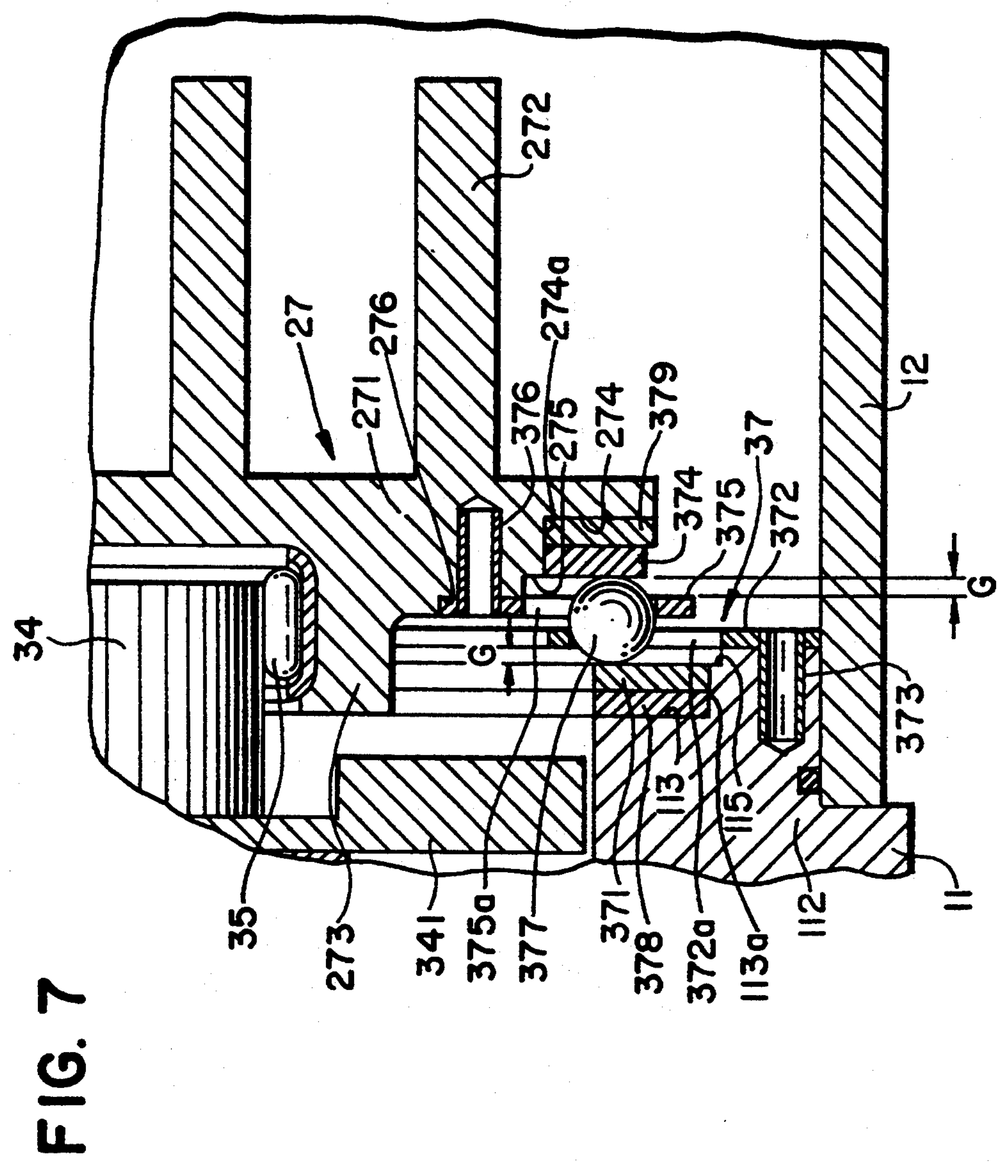
FIG. 7 is an enlarged longitudinal vertical sectional view of a portion of the compressor shown in FIG. 4.
Figure 8:
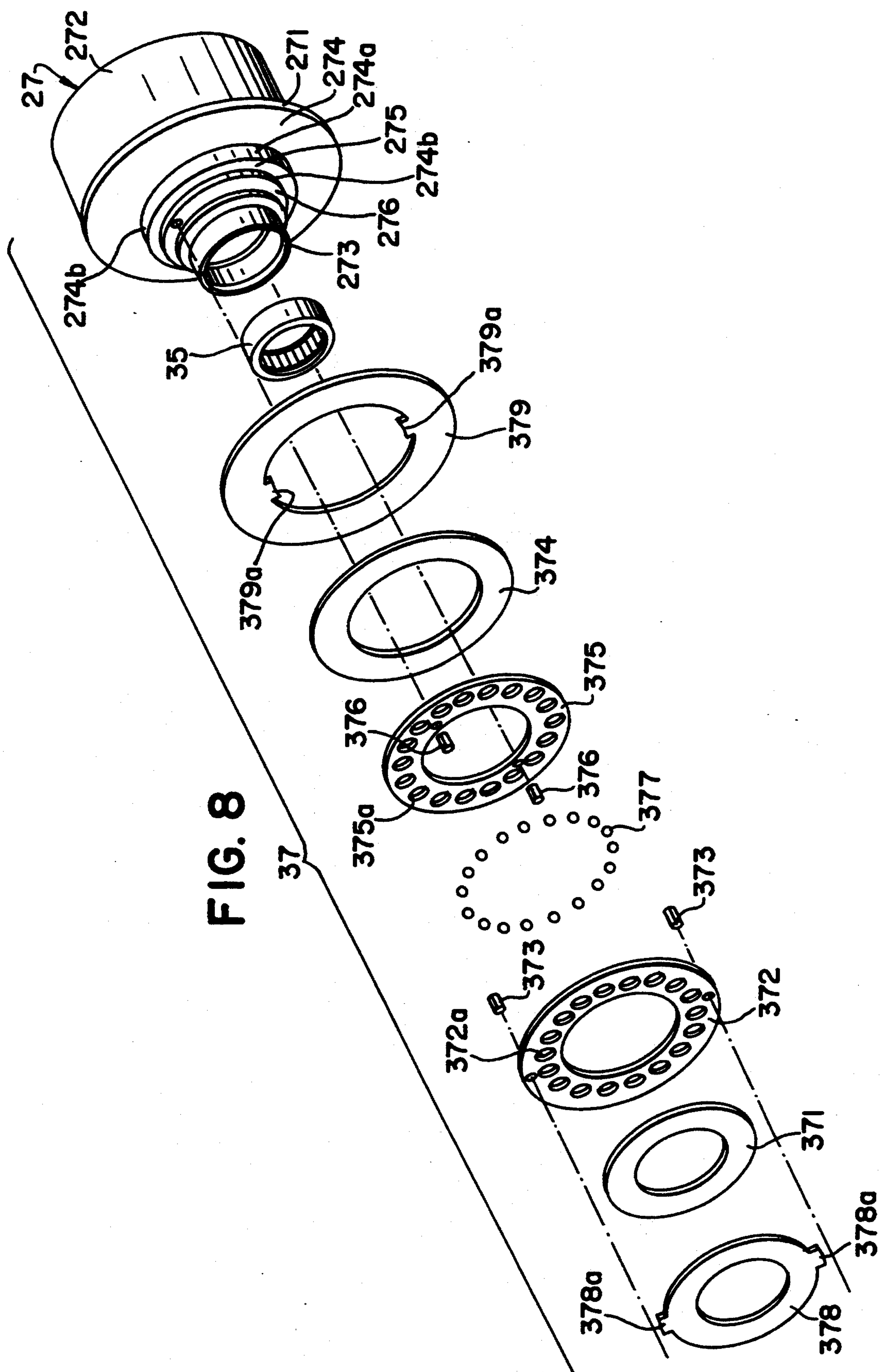
FIG. 8 is an exploded perspective view of the rotation preventing/thrust bearing device shown in FIG. 4.

Referring to FIGS. 7 and 8, in addition to FIG. 4, rotation preventing/thrust bearing device 37 surrounds boss 273 of orbiting scroll 27. Annular steps 274, 275, and 276, which concentrically surround boss 273, are formed at the end surface of circular end plate 271 opposite to spiral element 272. Annular step 274 is radially largest and closest to spiral element 272. Annular step 276 is radially smallest and furthest from spiral element 272. Annular step 275 is located between annular steps 274 and 276. Similarly, annular steps 113 and 115 are formed at the end surface of annular projection 112 of front end plate 11 which rotatably supports disk 18 of drive shaft 13 through bearing device 19 and is fixedly attached to the opening end of casing 12. Annular steps 113 and 115 are concentric with annular projection 112, and annular step 113 is radially smallest and furthest from spiral element 272.

Rotation preventing/thrust bearing device 37 includes an orbital portion, a fixed portion and bearings, such as a plurality of balls or spheres. The fixed portion includes (1) first annular anti-wear plate 378 which is disposed surrounding annular step 113 by a later-mentioned manner, (2) first annular race 371 with which the first annular anti-wear plate 378 is overlaid within annular step 113, and (3) first ring 372 fitted against the axial end surface of annular projection 112 of front end plate 11 to cover the end surface of first annular race 371. First annular anti-wear plate 378 is loosely fitted surrounding annular step 113 because the outer diameter of first annular anti-wear plate 378 is designed to be slightly smaller than a diameter of an annular side wall 113*a* of annular step 113.

At least one truncated fan-shaped cut-out portion (not shown) is radially outwardly cut out from the annular side wall 113*a* of annular step 113. In this embodiment, a pair of cut-out portions are diametrically opposed from each other. At least one truncated fan-shaped projection 378*a* is radially outwardly projected from an outer peripheral surface of first annular anti-wear plate 378. In this embodiment, a pair of projections 378*a* are diametrically opposed from each other in order to fit within the pair of cut-out portions. The length and width of projections 378*a* are designed to be equal to the depth and width of cut-out portions, respectively. Thus, both the circumferential and radial movements of first annular anti-wear plate 378 are prevented during operation of the compressor. First annular race 371 is also loosely fitted surrounding annular step 113 because the outer diameter of first annular race 371 is also designed to be slightly smaller than the diameter of the annular side wall 113*a* of annular step 113. First ring 372 is fixedly attached to the axial end surface of annular projection 112 by pins 373. First annular race 371 has an axial end surface flush with the axial end surface of annular step 115. The height differential between the axial end surface of annular step 115 and the axial end surface of annular projection 112 of front end plate 11 defines a clearance "G" between first annular race 371 and first ring 372.

The orbital portion includes (1) second annular anti-wear plate 379 which is disposed surrounding annular step 274 by a later-mentioned manner, (2) second annular race 374 on which second annular anti-wear plate 379 is overlaid surrounding annular step 274, and (3) second ring 375 fitted against the axial end surface of annular step 276 to cover the axial end surface of second annular race 374. Second annular anti-wear plate 379 is designed to be slightly greater in diameter than that of the annular side wall 274*a* of annular step 274. At least one truncated fan-shaped cut-out portion 274*b* is radially inwardly cut out from the annular side wall 274*a* of annular step 274. In this embodiment, a pair of cut-out portions 274*b* are diametrically opposed from each other. At least one truncated fan-shaped projection 379*a* is radially inwardly projected from an inner peripheral surface of second annular anti-wear plate 379. In this embodiment, a pair of projections 379*a* are diametrically opposed from each other in order to fit within the pair of cut-out portions 274*b* . The length and width of projections 379*a* are designed to be equal to the depth and width of cut-out portions 274*b*, respectively. Thus, both the circumferential and radial movements of second annular anti-wear plate 379 are prevented during operation of the compressor. Second annular race 374 is also loosely fitted surrounding annular step 274 because the inner diameter of second annular race 374 is also designed to be slightly greater in diameter than that of the annular side wall 274*a* of annular step 274. Second ring 375 is fixedly attached to the axial end surface of annular step 276 by pins 376. Second annular race 374 has an axial end surface flush with the axial end surface of annular step 275. The height differential between the axial end surface of annular step 275 and the axial end surface of annular step 276 defines a clearance "G" between the second annular race 374 and the second ring 375 identical to the clearance between the first annular race 371 and the first ring 372.

First ring 372 and second ring 375 each have a plurality of holes or pockets 372*a* and 375*a* in the axial direction, the number of holes or pockets in each ring 372, 375 being equal. The holes or pockets 372*a* of first ring 372 correspond to or are a mirror image of the holes or pockets 375*a* of the second ring 375, i.e., each pair of pockets facing each other have the same size and pitch, and the radial distance of the pockets from the center of their respective rings 372 and 375 is the same, i.e., the centers of the pockets are located the same distance from the center of the rings 372 and 375.

In this embodiment, in order to be able to sufficiently bear the axial thrust load and the interacting stress, balls 377, first and second rings 372 and 375, and first and second annular races 371 and 374 are made of stiff and hard material, for example, steel, as in the aforementioned prior art embodiment, while, in order to reduce the weight of the compressor, front end plate 11, casing 12, and the two scroll members 26 and 27 are made of light weight material, for example, aluminum alloy, also as in the aforementioned prior art embodiment. In addition, first and second annular anti-wear plates 378 and 379 are made of similar material to that of first and second annular races 371 and 374, i.e., steel, so that hardness of first and second annular anti-wear plates 378 and 379 is equal to that of first and second annular races 371 and 374.

Accordingly, as the first annular race 371 freely rotates on the axial end surface of first annular anti-wear plate 378 during operation of the compressor, the axial end surface of first annular race 371 and the axial end surface of first annular anti-wear plate 378 become in frictional contact between two hard metal surfaces, while the opposite axial end surface of first annular anti-wear plate 378 does not come in a frictional contact with the axial end surface of annular step 113 of front end plate 11 because both the circumferential and radial movements of first annular anti-wear plate 378 are prevented. Because the axial end surface of first annular race 371 and the axial end surface of first annular anti-wear plate 378 are in frictional contact between two hard metal surfaces, abrasion of the mating surfaces of first annular race 371 and first annular anti-wear plate 378 is sufficiently reduced. Therefore, the clearance "G" between first annular race 371 and first ring 372 is maintained at the allowable value during an extended operation period of the compressor. A similar operation is carried out between second annular race 374 and second ring 375. Accordingly, effective operation of the compressor is maintained for a greatly increased period.

Furthermore, the mating surfaces of first annular race 371 and first annular anti-wear plate 378 are formed to be a fine surface, so that first annular race 371 rotates smoothly on the axial end surface of first annular anti-wear plate 378. For example, the mating surfaces of first annular race 37 and first annular anti-wear plate 378 can be formed by grinding to a fine surface wherein surface roughness is defined to be Ra=0.25 a (ANSI B46.1-1978). Therefore, abrasion of the mating surfaces of first annular race 371 and first annular anti-wear plate 378 is further reduced. In a similar manner, abrasion of the mating surfaces of second annular race 374 and second annular anti-wear plate 379 is also further reduced by forming their mating surfaces as a fine surface. Accordingly, effective operation of the compressor is maintained for an extended time period.

In this embodiment, both the circumferential and radial movements of first and second annular anti-wear plates 378 and 379 are prevented by providing the fan-shaped projections 378*a* and 379*a* and the corresponding fan-shaped cut-out portions. Nevertheless, both the circumferential and radial movements of first and second annular anti-wear plates 378 and 379 can be prevented without providing the fan-shaped projections 378*a* and 379*a* and the corresponding cut-out portions if the annular anti-wear plates 278 and 379 are fixedly disposed within the annular steps 113 and 274, for example, by forcible insertion respectively.

This invention has been described in detail in connection with the preferred embodiment. This embodiment, however, is merely an example, and the invention is not restricted thereto. It will be understood by those skilled in the art that other variations and modifications can be easily made within the scope of this invention as defined by the appended claims.

We claim:

1. In a scroll type fluid displacement apparatus including a housing, a fixed scroll attached to said housing and having a first end plate from which a first wrap extends into said housing, an orbiting scroll having a second end plate from which a second wrap extends, said first and second wraps interfitting at an angular and radial offset to make a plurality of line contacts to define at least one pair of sealed off fluid pockets and a driving mechanism operatively connected to said orbiting scroll to effect the orbital motion of said orbiting scroll, rotation preventing means for preventing the rotation of said orbiting scroll and for carrying axial thrust load from said orbital scroll during orbital motion so that the volume of said fluid pockets changes, said rotation preventing/thrust bearing means being disposed between said second end plate and said housing and being comprised of a discrete orbital portion, a discrete fixed portion and bearing elements coupled between said portions, said fixed portion including a first annular race and a first ring, a first annular step formed in said housing, said first annular race being placed in a loose fit within said first annular step, said first ring being attached to said housing to cover said first annular race, said first ring having a plurality of first pockets extending axially toward said first annular race and formed separately from said first annular race, said orbital portion including a second annular race and a second ring, said second annular race being placed in a loose fit within a second annular step formed in said second end plate, said second ring being attached to said second end plate to cover said second annular race and facing said first ring, said second ring having a plurality of second pockets extending axially toward said second annular race and formed separately from said second annular race, a clearance being maintained between said first ring of said fixed portion and said second ring of said orbital portion, said bearing elements each being carried within a generally aligned pair of said first and second pockets and contacting said second and first annular races to prevent the rotation of said orbiting scroll by said bearing elements interacting with said second and first rings and to carry the axial thrust load from said orbiting scroll on said first race through said bearing elements, the improvement comprising:

said fixed portion including a first annular plate which is fixedly placed surrounding said first annular step and is overlaid with said first annular race, said first annular plate being integrally planar and having a hardness which is substantially equal to a hardness of said first annular race.

2. In a scroll type fluid displacement apparatus including a housing, a fixed scroll attached to said housing and having a first end plate from which a first wrap extends into said housing, an orbiting scroll having a second end plate from which a second wrap extends, said first and second wraps interfitting at an angular and radial offset to make a plurality of line contacts to define at least one pair of sealed off fluid pockets and a driving mechanism operatively connected to said orbiting scroll to effect the orbital motion of said orbiting scroll, rotation preventing means for preventing the rotation of said orbiting scroll and for carrying axial thrust load from said orbital scroll during orbital motion so that the volume of said fluid pockets changes, said rotation preventing/thrust bearing means being disposed between said second end plate and said housing and being comprised of a discrete orbital portion, a discrete fixed portion and bearing elements coupled between said portions, said fixed portion including a first annular race and a first ring, a first annular step formed in said housing, said first annular race being placed in a loose fit within said first annular step, said first ring being attached to said housing to cover said first annular race, said first ring having a plurality of first pockets extending axially toward said first annular race and formed separately from said first annular race, said orbital portion including a second annular race and a second ring, said second annular race being placed in a loose fit within a second annular step formed in said second end plate, said second ring being attached to said second end plate to cover said second annular race and facing said first ring, said second ring having a plurality of second pockets extending axially toward said second annular race and formed separately from said second annular race, a clearance being maintained between said first ring of said fixed portion and said second ring of said orbital portion, said bearing elements each being carried within a generally aligned pair of said first and second pockets and contacting said second and first annular races to prevent the rotation of said orbiting scroll by said bearing elements interacting with said second and first rings and to carry the axial thrust load from said orbiting scroll on said first race through said bearing elements, the improvement comprising:

said orbital portion including a second annular plate which is fixedly placed surrounding said second annular step and is overlaid with said second annular race, said second annular plate being integrally planar and having a hardness which is substantially equal to a hardness of said second annular race.

3. The fluid displacement apparatus of claim 1 wherein said orbital portion includes a second annular plate which is fixedly placed surrounding said second annular step and is overlaid with said second annular race, said second annular plate having a hardness which is substantially equal to a hardness of said second annular race.

4. The scroll type fluid displacement apparatus of claim 1 wherein said first annular plate is made of steel.

5. The scroll type fluid displacement apparatus of claim 2 wherein said second annular plate is made of steel.

6. The scroll type fluid displacement apparatus of claim 1 wherein the hardness of said first annular plate is greater than the hardness of said housing.

7. The scroll type fluid displacement apparatus of claim 2 wherein the hardness of said second annular plate is greater than the hardness of said housing.

8. The scroll type fluid displacement apparatus of claim 2 wherein the hardness of said second annular plate is greater than the hardness of said orbiting scroll.

9. The scroll type fluid displacement apparatus of claim 4 wherein said housing and said orbiting scroll are made of aluminum alloy.

10. The scroll type fluid displacement apparatus of claim 5 wherein said housing and said orbiting scroll are made of aluminum alloy.

11. The scroll type fluid displacement apparatus of claim 1 wherein mating surfaces of said first annular plate and said first annular race are formed to be a fine surface.

12. The scroll type fluid displacement apparatus of claim 2 wherein mating surfaces of said second annular plate and said second annular race are formed to be a fine surface.

13. A scroll type fluid displacement apparatus comprising:

a housing having a front end plate;

a fixed scroll attached to said housing and having a first end plate from which a first wrap extends into an interior of said housing;

an orbiting scroll having a second end plate from which a second wrap extends, said first and second wraps interfitting at an angular and radial offset to make a plurality of line contacts to define at least a pair of sealed off fluid pockets;

a driving mechanism including a rotatable drive shaft connected to said orbiting scroll to drive said orbiting scroll in an orbital motion;

rotation preventing/thrust bearing means connected to said orbiting scroll for preventing the rotation of said orbiting scroll and for carrying the axial thrust of said orbiting scroll during its orbital motion;

said rotation preventing/thrust bearing means being comprised of a discrete orbital portion, a discrete fixed portion and bearing elements coupled between said portions, said fixed portion including a first annular race and a first ring, a first annular step formed in said housing, said first annular race being placed in a loose fit within said first annular step, said first ring being attached to said housing to cover said first annular race, said first ring having a plurality of first pockets extending axially toward said first annular race and formed separately from said first annular race, said orbital portion including a second annular race and a second ring, said second annular race being placed in a loose fit around a second annular step formed in said second end plate, said second ring being attached to said second end plate, to cover said second annular race and facing said first ring, said second ring having a plurality of second pockets extending axially toward said second annular race and formed separately from said second annular race, a clearance being maintained between said first ring of said fixed portion and said second ring of said orbital portion, said bearing elements each being carried within a generally aligned pair of said first and second pockets and contacting said second and first annular races to prevent the rotation of said orbiting scroll by said bearing elements interacting with said second and first rings and to carry the axial thrust load from said orbiting scroll on said first race through said bearing elements;

an annular plate having a hardness which is substantially equal to a hardness of at least one of said first annular race and said second annular race, said annular plate being integrally planar and positioned surrounding one of said first annular step and said second annular step.

14. The scroll type fluid displacement apparatus of claim 13 wherein said annular plate is substantially equal in hardness to that of said second annular race and said annular plate is positioned surrounding said second annular step.

15. The scroll type fluid displacement apparatus of claim 13 said annular plate being substantially equal in hardness to said first annular race and said annular plate being positioned surrounding said first annular step.

16. The scroll type fluid displacement apparatus of claim 13 wherein said annular plate is made of steel.

17. The scroll type fluid displacement apparatus of claim 13 wherein the hardness of said annular plate is greater than the hardness of said housing.

18. The scroll type fluid displacement apparatus of claim 13 wherein the hardness of said annular plate is greater than the hardness of said orbiting scroll.

19. The scroll type fluid displacement apparatus of claim 16 wherein said housing and said orbiting scroll are made of aluminum alloy.

20. The scroll type fluid displacement apparatus of claim 13 wherein the mating surfaces of said annular plate and said at least one of said first and second annular races are formed to be fine surfaces.

21. A scroll type fluid displacement apparatus comprising:

a housing having a front end plate;

a fixed scroll attached to said housing and having a first end plate from which a first wrap extends into an interior of said housing;

an orbiting scroll having a second end plate from which a second wrap extends, said first and second wraps interfitting at an angular and radial offset to make a plurality of line contacts to define at least a pair of sealed off fluid pockets;

a driving mechanism including a rotatable drive shaft connected to said orbiting scroll to drive said orbiting scroll in an orbital motion;

rotation preventing/thrust bearing means connected to said orbiting scroll for preventing the rotation of said orbiting scroll and for carrying the axial thrust of said orbiting scroll during its orbital motion;

said rotation preventing/thrust bearing means being comprised of a discrete orbital portion, a discrete fixed portion and bearing elements coupled between said portions, said fixed portion including a first annular race and a first ring, a first annular step formed in said housing, said first annular race being placed in a loose fit within said first annular step, said first ring being attached to said housing to cover said first annular race, said first ring having a plurality of first pockets extending axially toward said first annular race and formed separately from said first annular race, said orbital portion including a second annular race and a second ring, said second annular race being placed in a loose fit around a second annular step formed in said second end plate, said second ring being attached to said second end plate to cover said second annular race and facing said first ring, said second ring having a plurality of second pockets extending axially toward said second annular race and formed separately from said second annular race, a clearance being maintained between said first ring of said fixed portion and said second ring of said orbital portion, said bearing elements each being carried within a generally aligned pair of said first and second pockets and contacting said second and first annular races to prevent the rotation of said orbiting scroll by said bearing elements interacting with said second and first rings and to carry the axial thrust load from said orbiting scroll on said first race through said bearing elements;

an annular plate having a hardness which is substantially equal to a hardness of at least one of said first annular race and said second annular race, said annular plate positioned surrounding one of said first annular step and said second annular step;

wherein at least one of said first and second annular steps has a cutout portion, and said annular plate has a projecting portion engageable with said cutout portion to prevent the circumferential and radial movement of said annular plate.

22. The scroll type fluid displacement apparatus of claim 21, said annular plate being substantially equal in hardness to that of said first annular race, said annular plate positioned surrounding said first annular step, said circumferential and radial movement preventing portion cooperating with said first annular step to prevent the circumferential and radial movement of said annular plate.

23. The scroll type fluid displacement apparatus of claim 21, said annular plate being substantially equal in hardness to that of said second annular race, said annular plate positioned surrounding said second annular step, said circumferential and radial movement preventing portion cooperating with said second annular step to prevent the circumferential and radial movement of said annular plate.

24. The scroll type fluid displacement apparatus of claim 21 wherein said annular plate is integrally planar.

* * * * *